United States Patent
Li et al.

(10) Patent No.: US 8,144,420 B1
(45) Date of Patent: *Mar. 27, 2012

(54) VCM PWM CONTROL ARCHITECTURE FOR POWER SAVING IN HARD DISK DRIVES

(75) Inventors: Ying Tian Li, Singapore (SG); Siew Yong Chui, Singapore (SG); Cheng Yong Teoh, Singapore (SG)

(73) Assignee: Marvell International, Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/916,052

(22) Filed: Oct. 29, 2010

Related U.S. Application Data

(63) Continuation of application No. 11/511,841, filed on Aug. 28, 2006, now Pat. No. 7,848,045.

(60) Provisional application No. 60/783,910, filed on Mar. 20, 2006.

(51) Int. Cl.
*G11B 21/02* (2006.01)
*G11B 15/18* (2006.01)

(52) U.S. Cl. .............................. 360/75; 360/69; 318/599
(58) Field of Classification Search .................. None
See application file for complete search history.

(56) References Cited

U.S. PATENT DOCUMENTS

| 7,848,045 B1 * | 12/2010 | Li et al. ........................ 360/75 |
| 2002/0141097 A1 | 10/2002 | Kisaka et al. |
| 2005/0018340 A1 | 1/2005 | Tanner |

* cited by examiner

*Primary Examiner* — Andrew L Sniezek

(57) ABSTRACT

The power required by a voice coil motor (VCM) to maintain the head in the data region of a disk drive during an idle mode is further reduced. The current supplied to the VCM is switched on and off. This takes advantage of the inherent capacitance and inductance in the VCM, which maintains a current after the current supply is switched off. The current will slowly decay, with it being switched on again before it reaches a level where the average value won't offset the flex bias. In one embodiment, the current is maintained in a single direction, to offset the flex bias which pushes in one direction. Digital switches are used to reduce the power consumption of the control circuitry.

20 Claims, 8 Drawing Sheets

VCM PWM CONTROL ARCHITECTURE FOR POWER SAVING IN HARD DISK DRIVES

CROSS-REFERENCES TO RELATED APPLICATIONS

This application is a continuation application of commonly-assigned U.S. patent application Ser. No. 11/511,841, filed Aug. 28, 2006 (now U.S. Pat. No. 7,848,045), which claims the benefit under 35 USC 119(e) of U.S. provisional application No. 60/783,910, entitled "VCM PWM Control Architecture for Power Saving in Hard Disk Drives," filed Mar. 20, 2006, the contents of both of which are hereby incorporated by reference in their entirety.

BACKGROUND OF THE INVENTION

The present invention relates to saving power in disk drive idle modes, and in particular to reducing the power required by the disk head motor.

A disk drive typically comprises one or more disks in a stack, a spindle motor to rotate the disks, and one or more heads (transducers) which are moved across the disc surface by a Voice Coil Motor (VCM). The heads literally float on a cushion of air over the disk, generated by the rotation of the disk. When the disk is turned off, the heads are withdrawn so they don't come to rest on the disk and damage data or the head when power is turned off. In some designs, the heads are moved to an inner or outer crash stop and held in place by a permanent magnet field that doesn't require current to maintain.

During a standby mode, when a disk drive is not being accessed, it is common to save power by putting the disk drive in an idle mode. Completely powering down the disk drive is not typically done because that would require too much time to move the head back over the data region of the disk when the next data request is received. Rather, the spindle motor is slowed down to conserve power, while still causing the disks to spin fast enough to generate an air cushion to keep the head off the disk.

To position the heads over the disk, the typical hard disk drive has a head stack assembly (HSA) that includes a transducer, a pivotally mounted actuator arm for supporting the head, a VCM for exerting a torque onto the actuator arm, and a servo-controller for controlling the VCM. The VCM is a coil of wire next to a permanent magnet. The servo-controller moves the actuator arm by sending a control current through the coil which causes the permanent magnet to apply a force to the coil, which exerts a torque on the actuator arm.

To maintain the head inside the data area of the disk during idle, some current to the VCM is required. Without such current, a flex bias acting on the head will cause it to drift to the outside of the disk. This flex bias is a combination of factors, including the actuator arm flex torque and the air flow caused by the spinning disk acting on the head. Conventionally, during the VCM idle time, using a linear current control loop (CCL) control, a current in the VCM creates the torque required to overcome the flex bias to maintain the head inside the media. The power dissipation that is required during the linear current control loop (CCL) operation is equal to VDD* (Motor current+Quiescent current).

Due to continued advances in the state of the art of low power technology, it has become more important to extend system battery life for mobile hard drives. It would be desirable to further reduce the power required during an idle mode.

BRIEF SUMMARY OF THE INVENTION

In an embodiment of the present invention, the power required to maintain the head in the data region of a disk drive during an idle mode is further reduced. The current supplied to the VCM is switched on and off. This takes advantage of the inherent capacitance and inductance in the VCM, which maintains a current after the current supply is switched off. The current will slowly decay, with it being switched on again before it reaches a level where the average value won't offset the flex bias.

In one embodiment, the current is maintained in a single direction, to offset the flex bias which pushes in one direction. Digital switches are used to reduce the power consumption of the control circuitry.

In one embodiment, the disk drive control circuit provides a pulse width modulation (PWM) control signal to digital transistor switches providing an idle current to a voice coil motor (VCM). The pulse width modulation circuit includes the digital transistor switches which provide current in a single direction through the VCM. A sense resistor provides a voltage proportional to the idle current through the VCM. An amplifier amplifies the sensed voltage, which is very small since very small idle currents are being measured. A comparator circuit produces a comparator output when said amplified voltage exceeds a predetermined peak value. A delay circuit activates the transistor switches, and turns off the switch in response to the comparator indicating a peak value has been reached. The delay circuit simultaneously starts a delay timer, which keeps the switch off for a predetermined delay time until the control current has decayed to the lowest desired value.

In one embodiment, a method for controlling a voice coil motor in a disk drive is provided. The current to a voice coil motor (VCM) is switched on. The current to the VCM is then monitored. The current to the VCM is then switched off when it reaches a peak value. In one embodiment, the current to the VCM is switched on after a delay time after the peak value is reached.

In one embodiment, a method for controlling a disk drive is provided. The method involves providing a control current to a motor; applying a force to a disk drive head arm with said motor responsive to said control current; and pulse width modulating said control current during an idle mode. The pulse width modulating includes switching said control current to provide said control current in a single direction through said motor; sensing a current through said motor and providing a voltage proportional to said current through said motor; amplifying said voltage to produce an amplified voltage; comparing said amplified voltage to a predetermined peak value, and producing a comparator output when said amplified voltage exceeds said predetermined peak value; activating the provision of said control current; and responsive to said comparator output, turning off said control current for a predetermined delay time.

In one embodiment, means for controlling a disk drive are provided. The embodiment includes means for providing a control current to a motor; means for applying a force to a disk drive head arm with said motor responsive to said control current; and means for pulse width modulating said control current during an idle mode. The means for pulse width modulating includes means for switching said control current to provide said control current in a single direction through said motor; means for sensing a current through said motor and providing a voltage proportional to said current through said motor; means for amplifying said voltage to produce an amplified voltage; means for comparing said amplified voltage to a predetermined peak value, means for producing a comparator output when said amplified voltage exceeds said predetermined peak value; means for activating the provision of said control current; and responsive to said comparator output, means for turning off said control current for a predetermined delay time.

In one embodiment, the means for sensing a current through said motor further includes means for sensing a voltage across a resistor in series with said motor. The means for switching said control current further includes means for providing current to a first side of said motor with a PMOS transistor; means for sinking said current from a second side of said motor with a first NMOS transistor; and means for sinking a decaying current from a first side of said motor when said PMOS transistor is turned off with a second NMOS transistor. Also provided are means for biasing said second NMOS transistor to always be off, and means for sinking said decaying current through a body diode of said second NMOS transistor.

In one embodiment, the means for comparing further includes means for buffering said amplified voltage through a first PMOS transistor; means for providing a desired peak voltage through a second PMOS transistor; means for comparing the voltages at the drains of said first and second PMOS transistors; means for converting a digital programmable offset signal to an analog signal; and means for providing said analog offset compensation signal to at least one of the inputs of a comparator for performing said comparing. An embodiment further includes means for storing digital bits in a register to set said predetermined peak value and said programmable offset compensation value. An embodiment further includes means for counting clock pulses to provide said predetermined delay time.

DETAILED DESCRIPTION OF THE INVENTION

Figure 1:
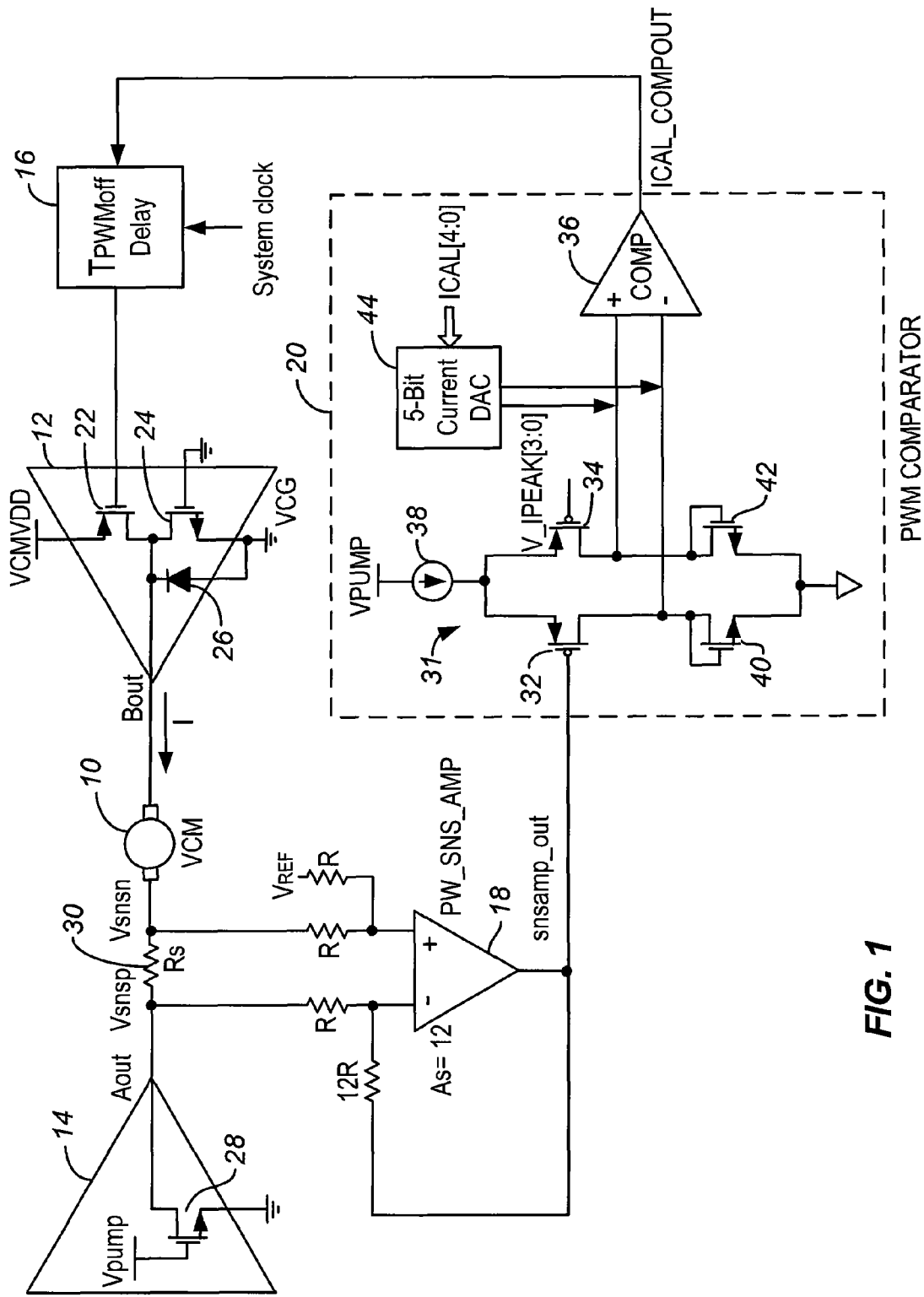
FIG. 1 is a diagram of a VCM idle current control system according to one embodiment of the invention.

FIG. 1 is a diagram of a VCM idle current control system according to one embodiment of the invention. Current I is provided to VCM 10 by switching circuit 12, and the current is sunk through a switching circuit 14. The turning on and off of switching circuit 12 is controlled by a delay circuit 16. A feedback circuit with an amplifier 18 and a comparator circuit 20 determines when the desired peak current has been reached, and provides a comparison signal to delay circuit 16 to turn off the current for a predetermined delay.

Figure 2A:
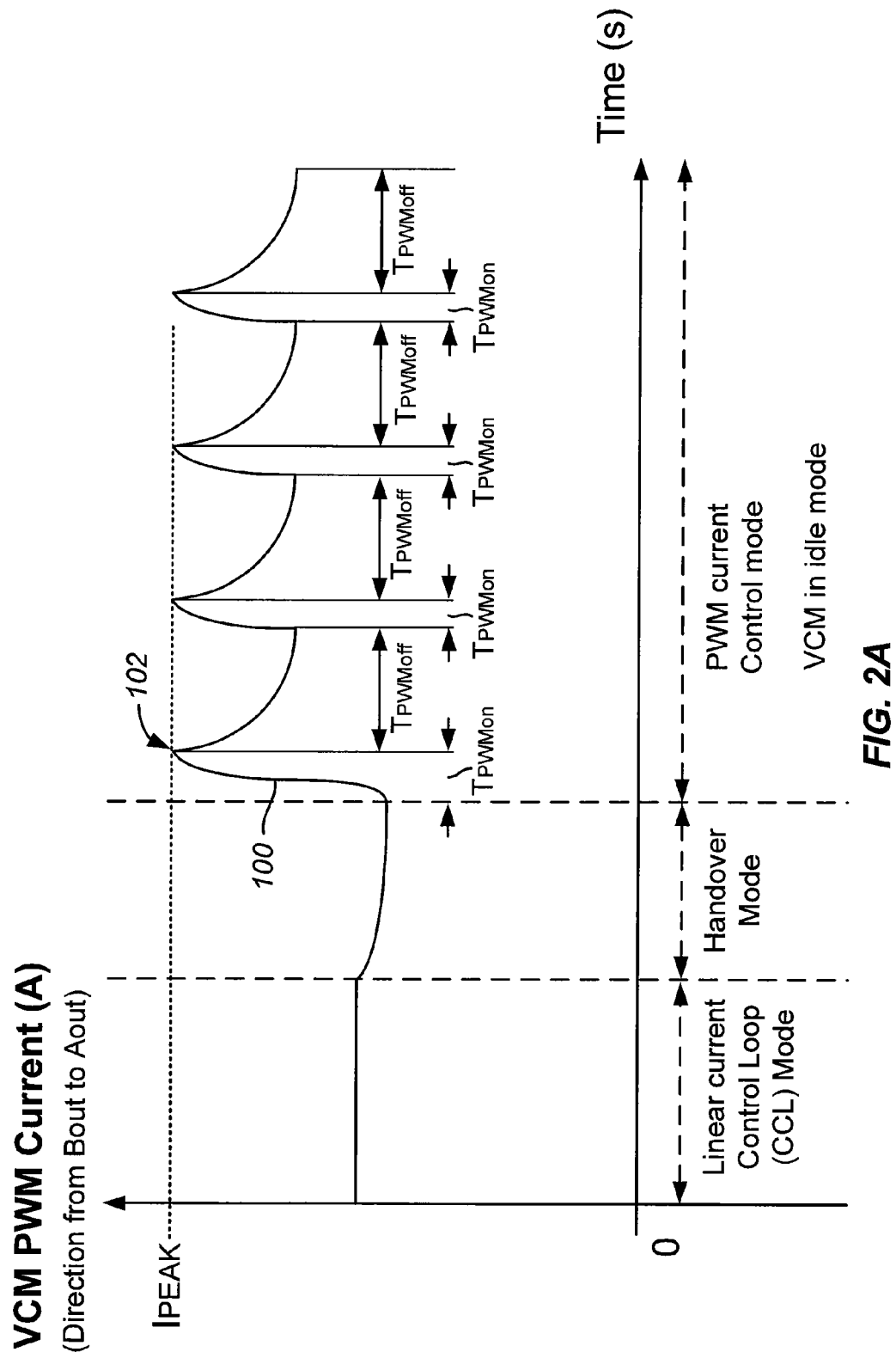
FIG. 2A is a diagram illustrating the VCM current profile produced by the circuit of FIG. 1.

Referring to FIG. 2A, a line 100 illustrates the current I during Idle mode in one embodiment. The current is controlled by a Pulse Width Modulated (PWM) control signal. During a first period $T_{PWMon}$ delay circuit 16 provides an ON signal to switching circuit 12, which provides current to VCM 10, and the current increases. When the current reaches a predetermined peak 102 ($I_{PEAK}$), the feedback circuit causes delay circuit 16 to switch off switching circuit 12, stopping the flow of current. The current then decays during time period $T_{PWMoff}$. A counter in delay circuit 16 is activated, and counts down the time period $T_{PWMoff}$. At the end of that time period, switching circuit 12 is turned on again, and the process repeats.

In one embodiment, the circuit of FIG. 1 is in parallel with a normal mode control circuit which provides the current to VCM 10 during normal seek operations. The switches of switching circuits 12 and 14 are turned off during normal mode. This allows the use of digital switches which require less current, since they aren't exposed to the higher currents of normal mode operation.

Returning to the embodiment of FIG. 1, during idle mode, PMOS transistor 22 in switching circuit 12 is periodically turned on to provide current I to VCM 10. NMOS transistor 24 has its gate grounded, and thus is always off. A diode 26 illustrates the body diode of transistor 24. When transistor 22 is turned off, the current I discharges through the body diode 26 of transistor 24.

The current I passes through VCM 10 and is sunk to ground by NMOS transistor 28 of switching circuit 14. In one embodiment, the gate of transistor 28 is tied to high (Vdd or Vpump), which is a voltage from a charge pump circuit that doubles the VDD voltage. The higher voltage reduces the transistor on-resistance.

Amplifier 18 amplifies a small voltage due to the current I across a resistor 30. This allows detection of when a peak current is reached for the feedback loop. An amplifier is used because the voltage will be very small due to the small current being detected. The amplified voltage (snsamp_out) at the output of amplifier 18 is provided to comparator 20, which provides a signal to delay circuit 16 when the peak voltage is reached.

A pre-amplifier 31 is used between amplifier 18 and a comparator 36. The amplifier 18 output is provided to the gate of transistor 32, with the drain of transistor 32 being connected to the negative input of comparator 36. A reference voltage (V_IPEAK[3:0]) is applied to the gate of corresponding transistor 34, whose drain is connected to the positive input of comparator 36. In one embodiment, the pre-amplifier 31 is connected to the same Vpump as switching circuit 14, through a current source 38. Pre-amplifier 31 is completed with transistors 40 and 42. An input (V_IPEAK[3:0]) to the gate of transistor 34 sets the desired reference voltage. This voltage can be provided by a Digital to Analog Converter (DAC, not shown), with a 3 bit input of control lines for setting the voltage value.

Because low voltages are being measured, the measured voltage will be within the range of the offset voltage at the input of comparator 36. Thus, a calibration voltage is applied to the input of comparator 36 to compensate for, or zero out, the offset voltage of amplifier 18, pre-amplifier 31 and comparator 36. This calibration voltage is provided by a Digital to Analog Converter (DAC) 44. DAC 44 is set by control lines ICAL[4:0]. These control lines, and the other lines described herein, can be connected to a register which is programmed with the desired values.

The output of comparator 36 is triggered when the desired peak voltage is reached. The output signal, ICAL_COMPOUT, is a digital one provided as a control input to delay circuit 16. This causes delay circuit 16 to provide an output to switch off transistor 22, and start a counter (not shown) to provide a fixed delay until transistor 22 is turned on again. In one embodiment, a 6 bit counter is sufficient. The fixed delay is time $T_{PWMoff}$ of FIG. 2A.

The present invention provides the advantage of reducing the power dissipation during VCM idle time by using a VCM PWM control architecture with offset calibration capability for accurate current control instead of a conventional linear current control loop (CCL).

In summary, in the embodiments of the VCM PWM (Pulse Width Modulation) Control mode of the present invention, the VCM class AB amplifiers in conventional prior art CCL circuits are replaced with digital switches. The Aout is always pulled to VCM ground. During PWM on, the charging current will conduct from VCM VDD to Aout through PMOS transistor 22. During PWM off, the discharging current will conduct from VCG to Aout through the body diode of NMOS transistor 24. The power efficiency improves as the excessive dissipation in the output drivers of the prior art is eliminated.

The power dissipated in PWM mode in an embodiment of the invention is equal to:

Imotor$^2$*[(Rdson(transistor 22)+Rmotor+Rsense+ Rdson(trans.28)]*duty cycle.

In one embodiment, once the PWM control mode is enabled, the value of the peak current is set through a serial port by writing to Ipeak[3:0], which sets the peak current range. When the VCM load current hits the Ipeak, the comparator will turn off the PMOS driver transistor 22. When the PMOS driver transistor 22 is off, the VCM current discharges for a fixed PWM off time ($T_{PWMoff}$). $T_{PWMoff}$ is proportional to the system clock as follow:

$$T_{PWMoff} = Tsysclk \times (2^6 - 1)$$
$$= Tsysclk \times 63$$

For example, if Tsysclk=33 MHz, then $T_{PWMoff}$=1.9 us.

One embodiment of the VCM current profile is shown in FIG. 2A. The first time period shown, "Linear Current Control Loop (CCL) Mode," is the current provided during normal operation of the disk drive, between seek and find operations, but before entering an idle mode. Next, a "handover mode," which is a transition mode, is shown when the CCL circuitry is switched off, and the PWM circuitry of the present invention is switched on.

VCM PWM Control Calibration

To ensure the accuracy of the Ipeak detection, a calibration for the sense amplifier and comparator offset is performed in one embodiment. It is recommended to perform this calibration before the loading of the head.

Figure 3:
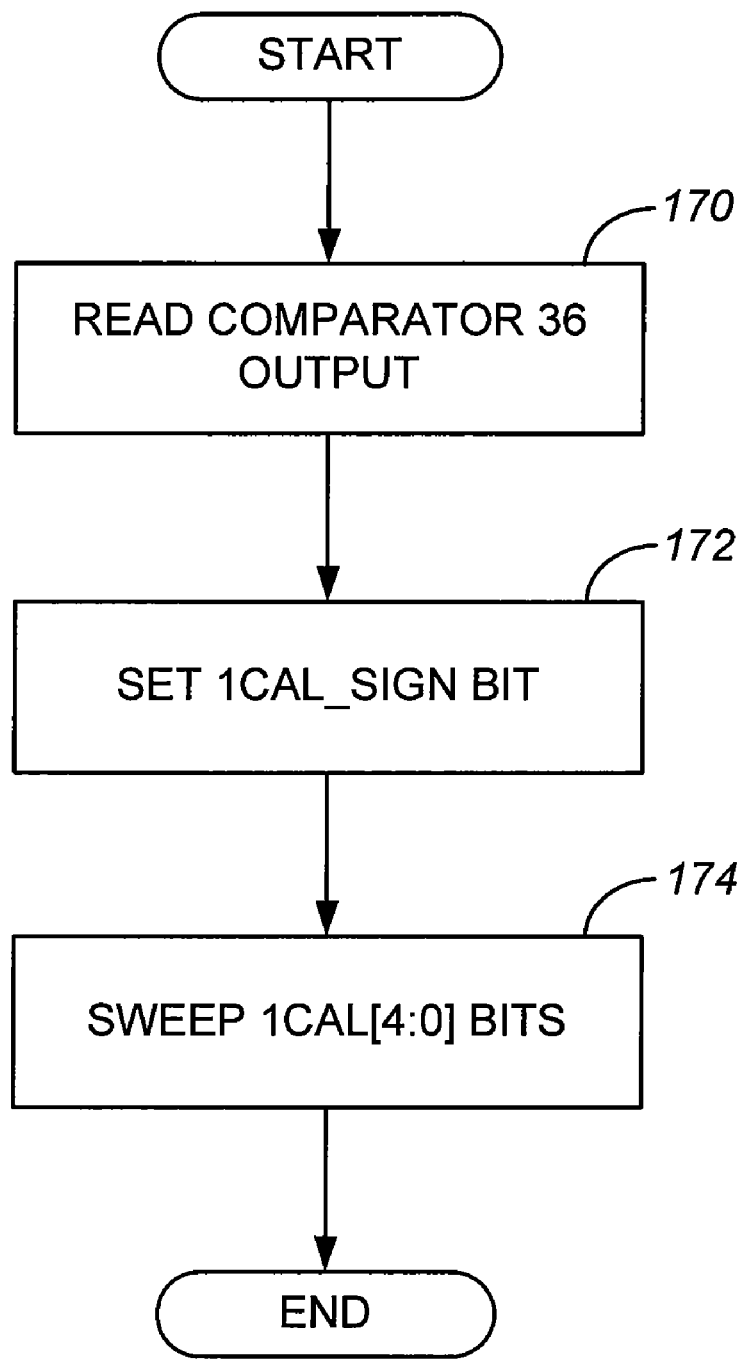
FIG. 3 is a flow chart illustrating an embodiment of a method for VCM PWM control calibration.

The recommended steps to perform offset calibration are as follows, as illustrated in the flowchart of FIG. 3:

Read back the ICAL_COMPOUT bit (output of comparator 36) from a serial port status register connected to this line (step 170). ICAL_COMPOUT indicates the polarity of the sense amplifier's input-referred offset.

Set the ICAL_SIGN bit=ICAL_COMPOUT (step 172) by writing to a serial port connected to this input line (not shown), which is connected to 5 bit current DAC 44. For example, if the value read back is ICAL_COMPOUT=0, then set ICAL_SIGN=0.

Sweep the ICAL[4:0] bits (step 174) by writing to the serial port until ICAL_COMPOUT changes polarity (depending on the polarity of the ICAL_COMPOUT). ICAL[4:0] will control the internal 5-bit DAC 44, whose LSB is 1 uA in one embodiment. This DAC will pump current into the PWM comparator 36 to calibrate the offset as illustrated in FIG. 1. The value of the ICAL[4:0], the VCM PWM control calibration, is maintained during operation of the circuit of FIG. 1.

In one embodiment, one or more of the amount of delay of the counter in delay circuit 16, the peak value V_IPEAK[3:0] provided to transistor 34, or the offset value ICAL[4:0] can be programmed to provide the minimal power needed to maintain the disk head in the desired position. Different combinations of these settings could also be used. For example, DAC 44 could be used not only to compensate for the offset of PWM comparator 20, but to also, in effect, fine-tune the peak value detected by the comparator circuit. Also, different combinations of peak values and delay times could be used to achieve the desired results.

Figure 2B:
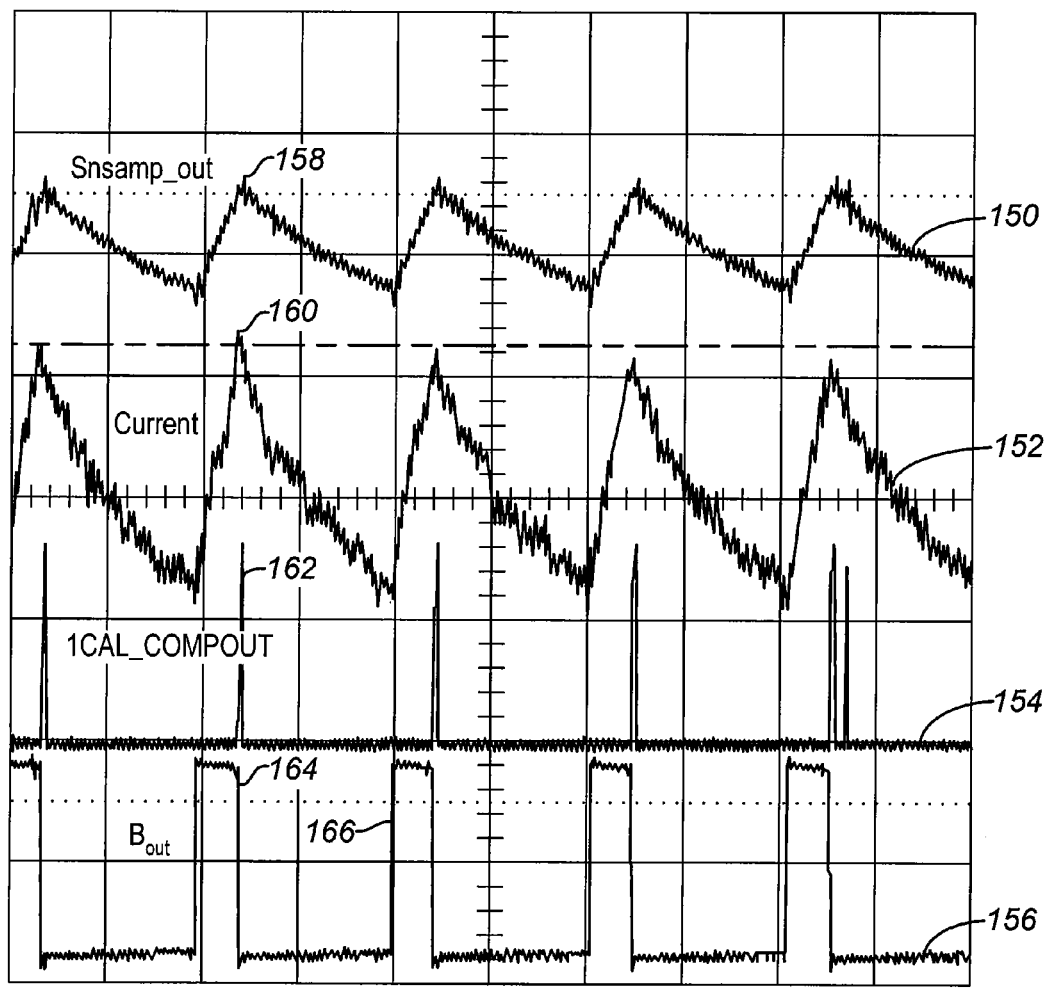
FIG. 2B is a diagram illustrating several waveforms produced by an embodiment of the circuit of FIG. 1.

FIG. 2B shows waveforms captured by a scope on one embodiment of the VCM PWM current control with IPEAK [3:0]=1000 after the offset calibration using a 1.8" hard drive. A first waveform 150 shows the output snsamp_out of amplifier 18 of FIG. 1, which is detecting the peak current. Waveform 152 is the current I which is detected. Waveform 154 is the output of PWM comparator 20, ICAL-COMPOUT. Waveform 156 is the output of switching circuit (driver) 12, Bout.

As can be seen from FIG. 2B, when the current reaches a peak 160, this is detected as peak 158 of snsamp_out. This signal is provided to the comparator, which detects the peak and produces an output signal 162. This causes delay circuit 16 to turn off its output, ending its pulse output. This also starts the counter in delay circuit 16 until the next PWM pulse. As the current starts to decay, snsamp_out signal 152 also starts to decay, turning off the digital one output of comparator 36, causing the output comp_out to look like a spike. In the last frame shown in FIG. 2B, a noise spike occurs after the triggered comp-out signal. However, this does not affect the system, since the Dout pulse has already been ended, and the counter in delay circuit 16 is already activated. Changing the input to delay circuit 16 at this point has no effect.

Figure 4A:
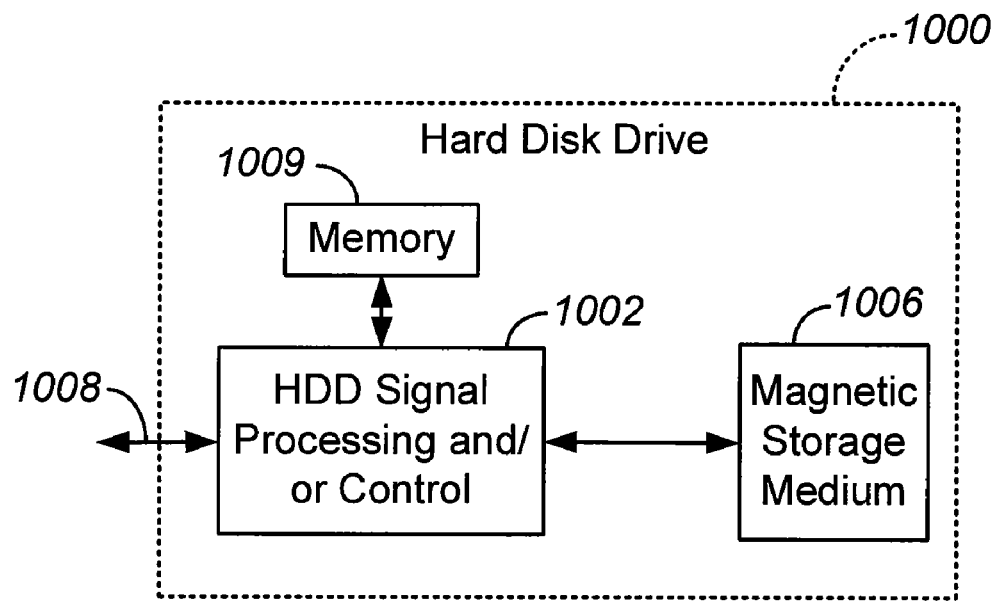
FIGS. 4A-4H show various devices in which the present invention may be embodied.

Referring now to FIGS. 4A-4G, various exemplary implementations of the present invention are shown. Referring to FIG. 4A, the present invention may be embodied in a hard disk drive 1000. The present invention may implement either or both signal processing and/or control circuits, which are generally identified in FIG. 4A at 1002. In some implementations, signal processing and/or control circuit 1002 and/or other circuits (not shown) in HDD 1000 may process data, perform coding and/or encryption, perform calculations, and/ or format data that is output to and/or received from a magnetic storage medium 1006.

HDD 1000 may communicate with a host device (not shown) such as a computer, mobile computing devices such as personal digital assistants, cellular phones, media or MP3 players and the like, and/or other devices via one or more wired or wireless communication links 1008. HDD 1000 may be connected to memory 1009, such as random access memory (RAM), a low latency nonvolatile memory such as flash memory, read only memory (ROM) and/or other suitable electronic data storage.

Figure 4B:
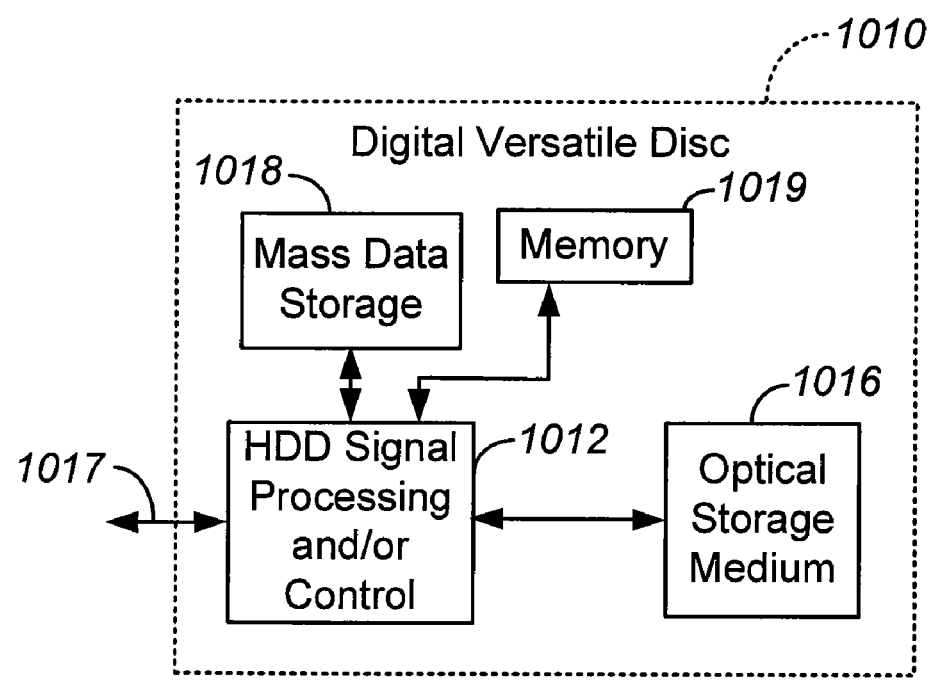

Referring now to FIG. 4B, the present invention may be embodied in a digital versatile disc (DVD) drive 1010. The present invention may implement in control circuits, which are generally identified in FIG. 4B at 1012, and/or mass data storage 1018 of DVD drive 1010.

DVD drive 1010 may communicate with an output device (not shown) such as a computer, television or other device via one or more wired or wireless communication links 1017. DVD 1010 may communicate with mass data storage 1018 that stores data in a nonvolatile manner. Mass data storage 1018 may include a hard disk drive (HDD) such as that shown in FIG. 4A. The HDD may be a mini HDD that includes one or more platters having a diameter that is smaller than approximately 1.8". DVD 1010 may be connected to memory 1019, such as RAM, ROM, low latency nonvolatile memory such as flash memory, and/or other suitable electronic data storage.

Figure 4C:
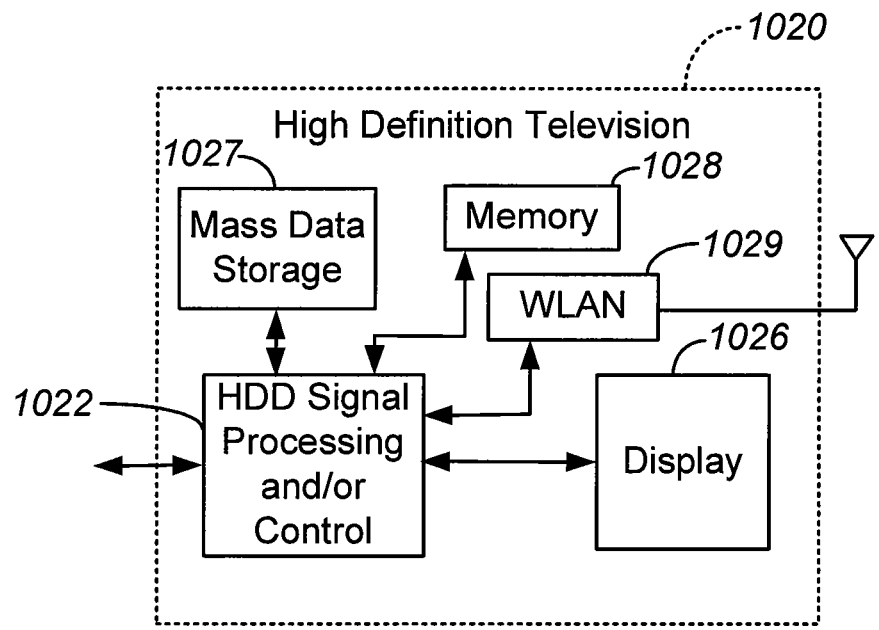

Referring now to FIG. 4C, the present invention may be embodied in a high definition television (HDTV) 1020. The present invention may implement control circuits, which are generally identified in FIG. 4C at 1022, a WLAN interface and/or mass data storage of the HDTV 1020. HDTV 1020 receives HDTV input signals in either a wired or wireless format and generates HDTV output signals for a display 1026.

HDTV 1020 may communicate with mass data storage 1027 that stores data in a nonvolatile manner such as optical and/or magnetic storage devices. At least one HDD may have the configuration shown in FIG. 4A and/or at least one DVD may have the configuration shown in FIG. 4B. The HDD may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029.

Figure 4D:
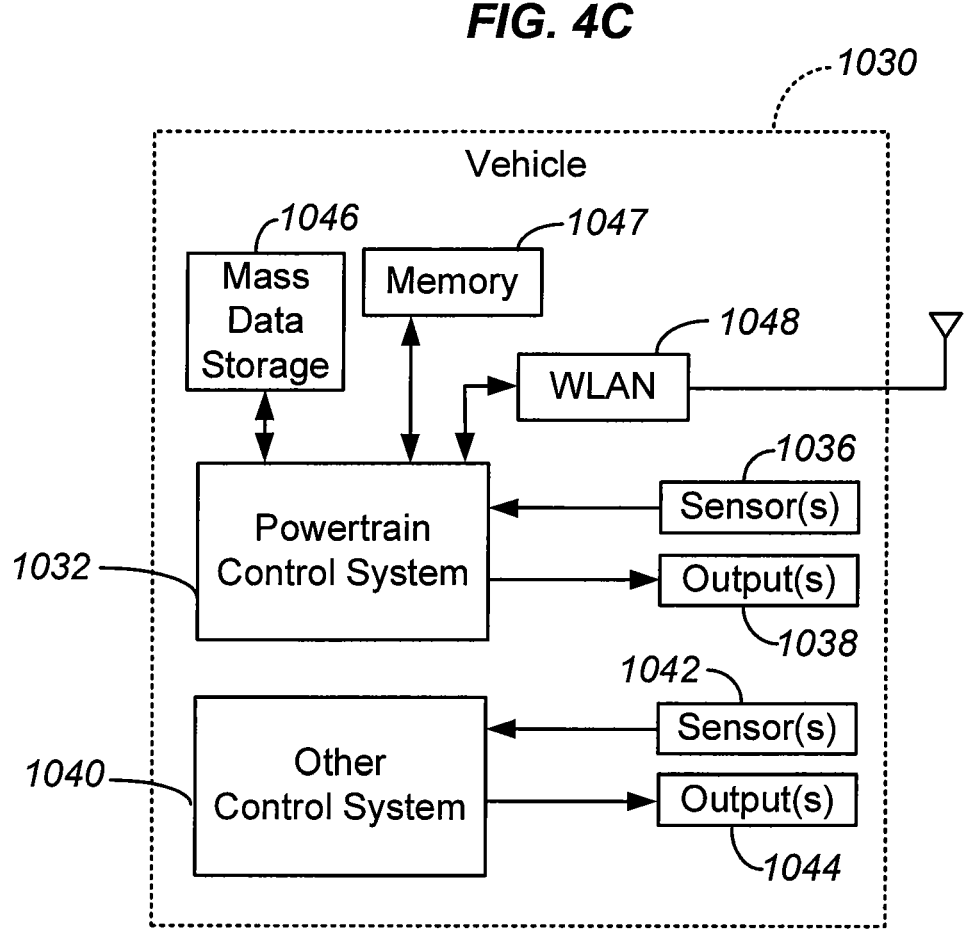

Referring now to FIG. 4D, the present invention implements a control system of a vehicle 1030, a WLAN interface and/or mass data storage of the vehicle control system. In some implementations, the present invention implements a powertrain control system 1032 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 1040 of vehicle 1030. Control system 1040 may likewise receive signals from input sensors 1042 and/or output control signals to one or more output devices 1044. In some implementations, control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1032 may communicate with mass data storage 1046 that stores data in a nonvolatile manner. Mass data storage 1046 may include optical and/or magnetic storage devices for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Powertrain control system 1032 may be connected to memory 1047 such as RAM, ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown).

Figure 4E:
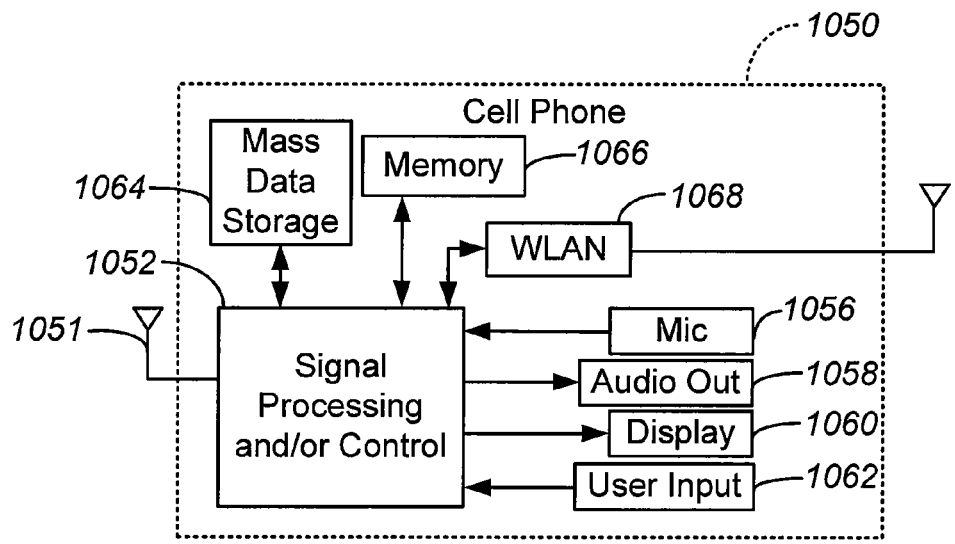

Referring now to FIG. 4E, the present invention may be embodied in a cellular phone 1050 that may include a cellular antenna 1051. The present invention may implement control circuits, which are generally identified in FIG. 4E at 1052, a WLAN interface and/or mass data storage of the cellular phone 1050. In some implementations, cellular phone 1050 includes a microphone 1056, an audio output 1058 such as a speaker and/or audio output jack, a display 1060 and/or an input device 1062 such as a keypad, pointing device, voice actuation and/or other input device.

Cellular phone 1050 may communicate with mass data storage 1064 that stores data in a nonvolatile manner such as optical and/or magnetic storage devices for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Cellular phone 1050 may be connected to memory 1066 such as RAM, ROM, low latency nonvolatile memory such as flash memory and/or other suitable electronic data storage. Cellular phone 1050 also may support connections with a WLAN via a WLAN network interface 1068.

Figure 4F:
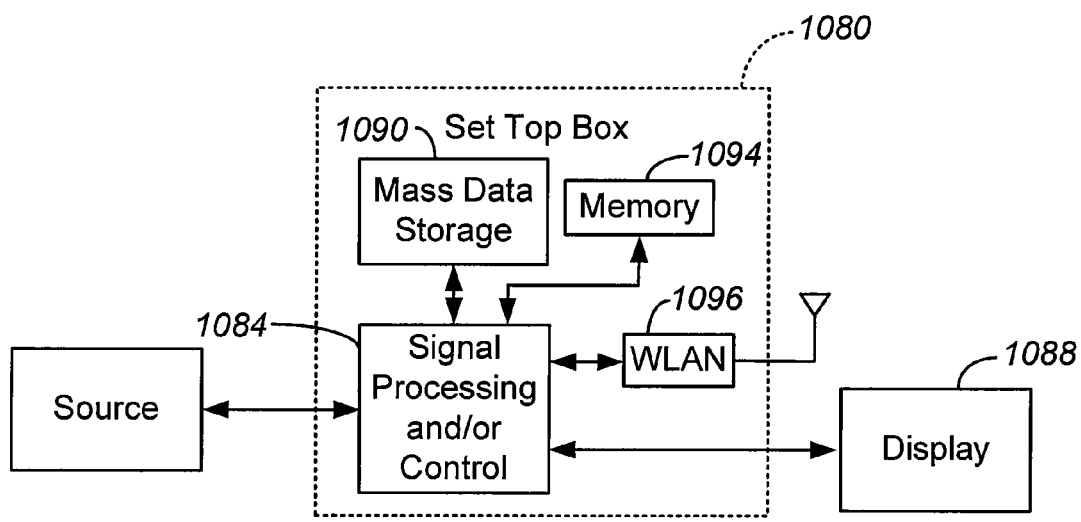

Referring now to FIG. 4F, the present invention may be embodied in a set top box 1080. The present invention may implement control circuits, which are generally identified in FIG. 4F at 1084, a WLAN interface and/or mass data storage of the set top box 1080. Set top box 1080 receives signals from a source such as a broadband source and outputs standard and/or high definition audio/video signals suitable for a display 1088 such as a television and/or monitor and/or other video and/or audio output devices.

Set top box 1080 may communicate with mass data storage 1090 that stores data in a nonvolatile manner. Mass data storage 1090 may include optical and/or magnetic storage devices for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096.

Figure 4G:
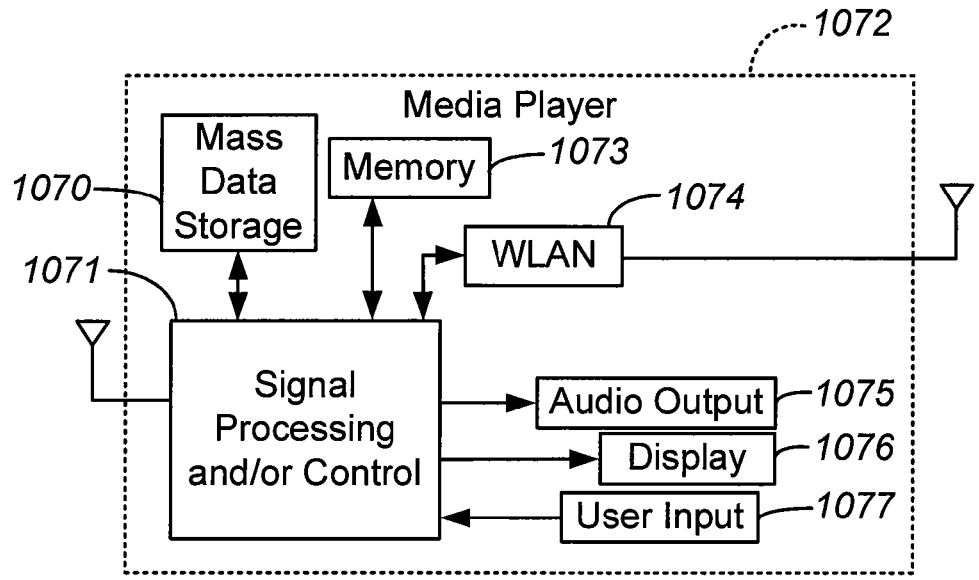

Referring now to FIG. 4G, the present invention may be embodied in a media player 1072. The present invention may implement control circuits, which are generally identified in FIG. 4G at 1071, a WLAN interface and/or mass data storage of the media player 1072. In some implementations, media player 1072 includes a display 1076 and/or a user input 1077 such as a keypad, touchpad and the like. In some implementations, media player 1072 may employ a graphical user interface (GUI) that typically employs menus, drop down menus, icons and/or a point-and-click interface via display 1076 and/or user input 1077. Media player 1072 further includes an audio output 1075 such as a speaker and/or audio output jack.

Media player 1072 may communicate with mass data storage 1070 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Media player 1072 may be connected to memory 1073 such as RAM, ROM, low latency nonvolatile memory such as flash memory and/or other suitable electronic data storage. Media player 1072 also may support connections with a WLAN via a WLAN network interface 1074.

Figure 4H:
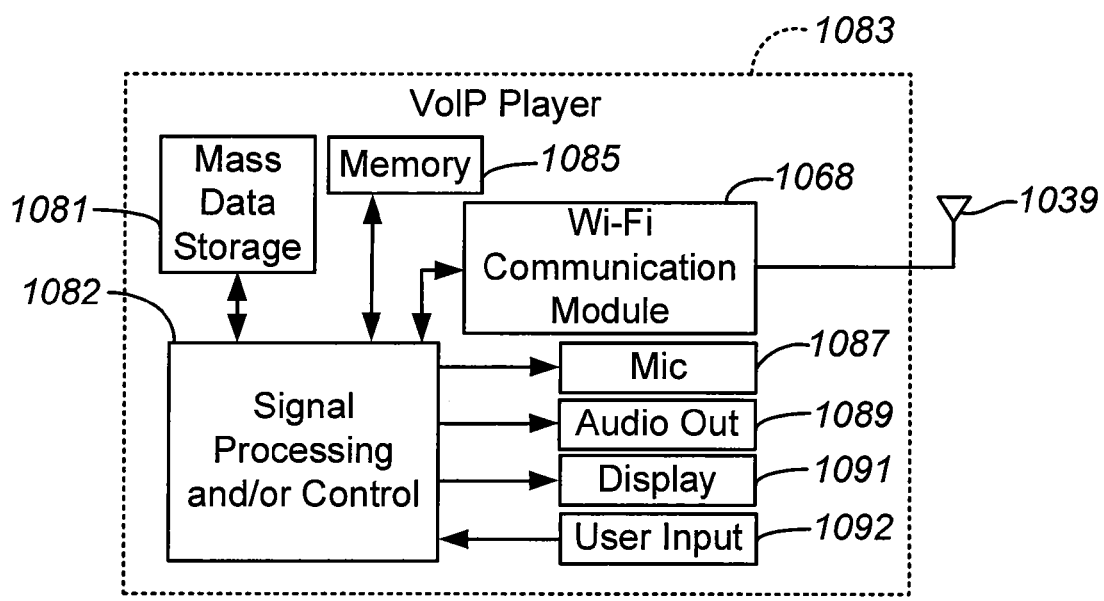

Referring to FIG. 4H, the present invention may be embodied in a Voice over Internet Protocol (VoIP) phone 1083 that may include an antenna 1039. The present invention may implement control circuits, which are generally identified in FIG. 4H at 1082, a wireless interface and/or mass data storage of the VoIP phone 1083. In some implementations, VoIP phone 1083 includes, in part, a microphone 1087, an audio output 1089 such as a speaker and/or audio output jack, a display monitor 1091, an input device 1092 such as a keypad, pointing device, voice actuation and/or other input devices, and a Wireless Fidelity (Wi-Fi) communication module 1086.

VoIP phone 1083 may communicate with mass data storage 502 that stores data in a nonvolatile manner such as optical and/or magnetic storage devices, for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". VoIP phone 1083 may be connected to memory 1085, which may be a RAM, ROM, low latency nonvolatile memory such as flash memory and/or other suitable electronic data storage. VoIP phone 1083 is configured to establish communications link with a VoIP network (not shown) via Wi-Fi communication module 1086. Still other implementations in addition to those described above are contemplated.

As will be appreciated by those of skill in the art, the present invention may be embodied in other specific forms without departing from the essential characteristics of the invention. For example, a low current point rather than a peak could be detected, with a timer provided for the amount of time the current is turned on. Alternately, the timer could be eliminated, with both a peak and low current being detected. Other designs for the PWM comparator circuit 20 could be used. Accordingly, the foregoing description is intended to be illustrative, but not limiting, of the scope of the invention which is set forth in the following claims.

What is claimed is:

1. A disk drive control circuit comprising:
   a circuit configured to control current supplied to a motor configured to control a disk drive head, the circuit configured to control the current before a value of the current reaches a lower current value while still maintaining the disk drive head in a data region of a disk drive during an idle mode, the lower current value comprising an average value that fails to offset a flex bias acting upon the disk drive head.

2. The disk drive control circuit of claim 1 wherein, wherein the circuit comprises a first circuit, the first circuit further comprises:
   a second circuit-configured to provide the current in a single direction through the motor.

3. The disk drive control circuit of claim 2 further comprising:
   a third circuit in communication with the second circuit, the third circuit configured to provide a control signal to activate the second circuit, the third circuit being responsive to a predetermined value of the current and further configured to turn off the control signal for a predetermined delay time.

4. The disk drive control circuit of claim 1 further comprising: a sensor providing a voltage proportional to the current through the motor; and an amplifier responsive to the voltage to produce an amplified voltage.

5. The disk drive control circuit of claim 1, wherein the circuit comprises a first circuit, the disk drive control circuit further comprising: a second circuit, responsive to the current, configured to produce a comparator output when the current exceeds a predetermined value.

6. The disk drive control circuit of claim 1 wherein the motor is a voice coil motor.

7. The disk drive control circuit of claim 1 wherein the circuit is further configured to turn OFF the current when the value of the current reaches an upper current value.

8. The disk drive control circuit of claim 7 wherein the upper current value comprises a predetermined peak value.

9. The disk drive control circuit of claim 1, wherein the circuit comprises a first circuit, the first circuit being configured to send a control signal to a second circuit that turns ON the second circuit, the second circuit being configured to supply current to the motor.

10. A method for controlling a disk drive comprising:
    applying a force to a disk drive head arm with a motor, the motor being responsive to a control current; and
    controlling the control current before a value of the control current reaches a lower current value while still maintaining the disk drive head in a data region of a disk drive during an idle mode, the lower current value comprising an average value that fails to offset a flex bias acting upon the disk drive head.

11. The method of claim 10 further comprising: providing the control current in a single direction through the motor.

12. The method of claim 10 further comprising:
    sensing the control current through the motor and providing a voltage proportional to the control current through the motor; and
    amplifying the voltage to produce an amplified voltage.

13. The method of claim 10 further comprising:
    comparing the control current to a predetermined value and producing a comparator output when the control current exceeds a predetermined value.

14. The method of claim 10 further comprising:
    provisioning the control current; and
    responsive to a predetermined value of the control current, turning off the control current for a predetermined delay time.

15. The method of claim 10 wherein the motor is a voice coil motor.

16. The method of claim 10 further comprising turning OFF the current when the value of the current reaches an upper current value.

17. The method of claim 16 wherein the upper current value comprises a predetermined peak value.

18. A method for controlling a voice coil motor (VCM) in a disk drive comprising:
    monitoring a current to the VCM to control a disk drive head;
    controlling the current before a value of the current reaches a lower current value while still maintaining the disk drive head in a data region of a disk drive during an idle mode, the lower current value comprising an average value that fails to offset a flex bias acting upon the disk drive head.

19. The method of claim 18 further comprising turning OFF the current when the value of the current reaches an upper current value.

20. The method of claim 19 wherein the upper current value comprises a predetermined peak value.

* * * * *